US011863935B2

(12) United States Patent
Burns

(10) Patent No.: US 11,863,935 B2
(45) Date of Patent: Jan. 2, 2024

(54) SOLENOID ACTUATOR IN A HEARING DEVICE

(71) Applicant: Starkey Laboratories, Inc., Eden Prairie, MN (US)

(72) Inventor: Thomas Burns, St. Louis Park, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 29 days.

(21) Appl. No.: 17/612,817

(22) PCT Filed: May 20, 2020

(86) PCT No.: PCT/US2020/033767
§ 371 (c)(1),
(2) Date: Nov. 19, 2021

(87) PCT Pub. No.: WO2020/236911
PCT Pub. Date: Nov. 26, 2020

(65) Prior Publication Data

US 2022/0225034 A1 Jul. 14, 2022

Related U.S. Application Data

(60) Provisional application No. 62/850,805, filed on May 21, 2019.

(51) Int. Cl.
*H04R 25/00* (2006.01)

(52) U.S. Cl.
CPC ......... *H04R 25/456* (2013.01); *H04R 25/652* (2013.01); *H04R 2225/41* (2013.01); *H04R 2460/11* (2013.01)

(58) Field of Classification Search
CPC .... H04R 25/65; H04R 25/456; H04R 25/652; H04R 2460/11
See application file for complete search history.

(56) References Cited

U.S. PATENT DOCUMENTS 5,084,224 A * 1/1992 Watters .................. B29C 41/46 264/156
2009/0067661 A1 3/2009 Keady et al.
(Continued)

FOREIGN PATENT DOCUMENTS

| | | |
|---|---|---|
| EP | 2835987 | 2/2015 |
| WO | 2015/101505 | 7/2015 |
| WO | 2019/052715 | 3/2019 |

OTHER PUBLICATIONS

International Search Report and Written Opinion from PCT Application No. PCT/US2020/033767 dated Jul. 24, 2020, 10 pages.

*Primary Examiner* — Suhan Ni
(74) *Attorney, Agent, or Firm* — Mueting Raasch Group

(57) ABSTRACT

A hearing device may include an earpiece, and ear-tip suspension element disposed in the earpiece, a solenoid actuator, and a controller. The earpiece and the ear-tip suspension element may include passageways that connect to form a vent through the earpiece. The solenoid actuator may include a solenoid and a core. The core may be movable between an open position and a closed position to open and close the vent. The controller may include one or more processors and may be operably coupled to the solenoid actuator to control movement of the core between the open and closed position. The controller may be configured to move the core using the solenoid based on at least a listening environment of the hearing device.

20 Claims, 7 Drawing Sheets

(56) References Cited

U.S. PATENT DOCUMENTS

| | | | | |
|---|---|---|---|---|
| 2010/0014696 | A1 | 1/2010 | Boschung et al. | |
| 2012/0308062 | A1* | 12/2012 | Djalilian .............. | H04R 1/1058<br>381/328 |
| 2014/0169603 | A1 | 6/2014 | Sacha et al. | |

* cited by examiner

SOLENOID ACTUATOR IN A HEARING DEVICE

CROSS-REFERENCE TO RELATED APPLICATIONS

This application is a U.S. National Stage application under 35 U.S.C. § 371 of PCT Application No. PCT/US2020/033767, filed May 20, 2020, which claims the benefit of U.S. Provisional Application No. 62/850,805, filed May 21, 2019, the disclosures of which are incorporated by reference herein in their entireties.

BACKGROUND

Hearing devices, such as hearing aids, can be used to transmit sounds to one or both ear canals of a wearer. Some hearing devices can include electronic components disposed within a housing that is placed in a cleft region that resides between an ear and a skull of the wearer. Such housings typically can be connected to an earpiece that is disposed in an ear canal of the ear of the wearer. Some hearing devices can include electronic components disposed within a custom molded housing that resides in the ear canal of the wearer. Earpieces and custom molded housings may include a vent that can allow ambient sound to enter the ear canal and provide localization cues and situational awareness. Vents of custom fit earpieces may also prevent occlusion effects.

SUMMARY

In general, the present disclosure provides various embodiments of a solenoid actuator for a hearing device and a method of operating such solenoid actuator. The solenoid actuator may be operated to open and close a vent of an earpiece of the hearing device.

In one aspect, the present disclosure provides a hearing device that includes an earpiece having an earpiece passageway, and an ear-tip suspension element disposed in the earpiece. The ear-tip suspension element includes an ear-tip passageway connected to the earpiece passageway to form a vent through the earpiece. The hearing device further includes a solenoid actuator that includes a solenoid and a core, where the core is movable between an open position and a closed position to open and close the vent; and a controller having one or more processors and operably coupled to the solenoid actuator to control movement of the core between the open and closed position. The controller is configured to move the core using the solenoid based on at least a listening environment of the hearing device.

In another aspect, the present disclosure provides a method that includes determining a listening environment of a hearing device, and moving a core of a solenoid actuator between an open position and a closed position to open and close a vent disposed in a housing of the hearing device based on at least the determined listening environment of the hearing device.

In another aspect, the present disclosure provides a solenoid boot that includes an ear-tip suspension element and a solenoid actuator. The ear-tip suspension element includes an ear-tip passageway and a barrier movable between an open position and a closed position to open and close the ear-tip passageway. The solenoid actuator includes a solenoid and a core. The core is coupled to the barrier and configured to move the barrier between the open position and the closed position based on a current received by the solenoid.

BRIEF DESCRIPTION OF THE DRAWINGS

Throughout the specification, reference is made to the appended drawings, where like reference numerals designate like elements, and wherein.

DETAILED DESCRIPTION

Figure 1:
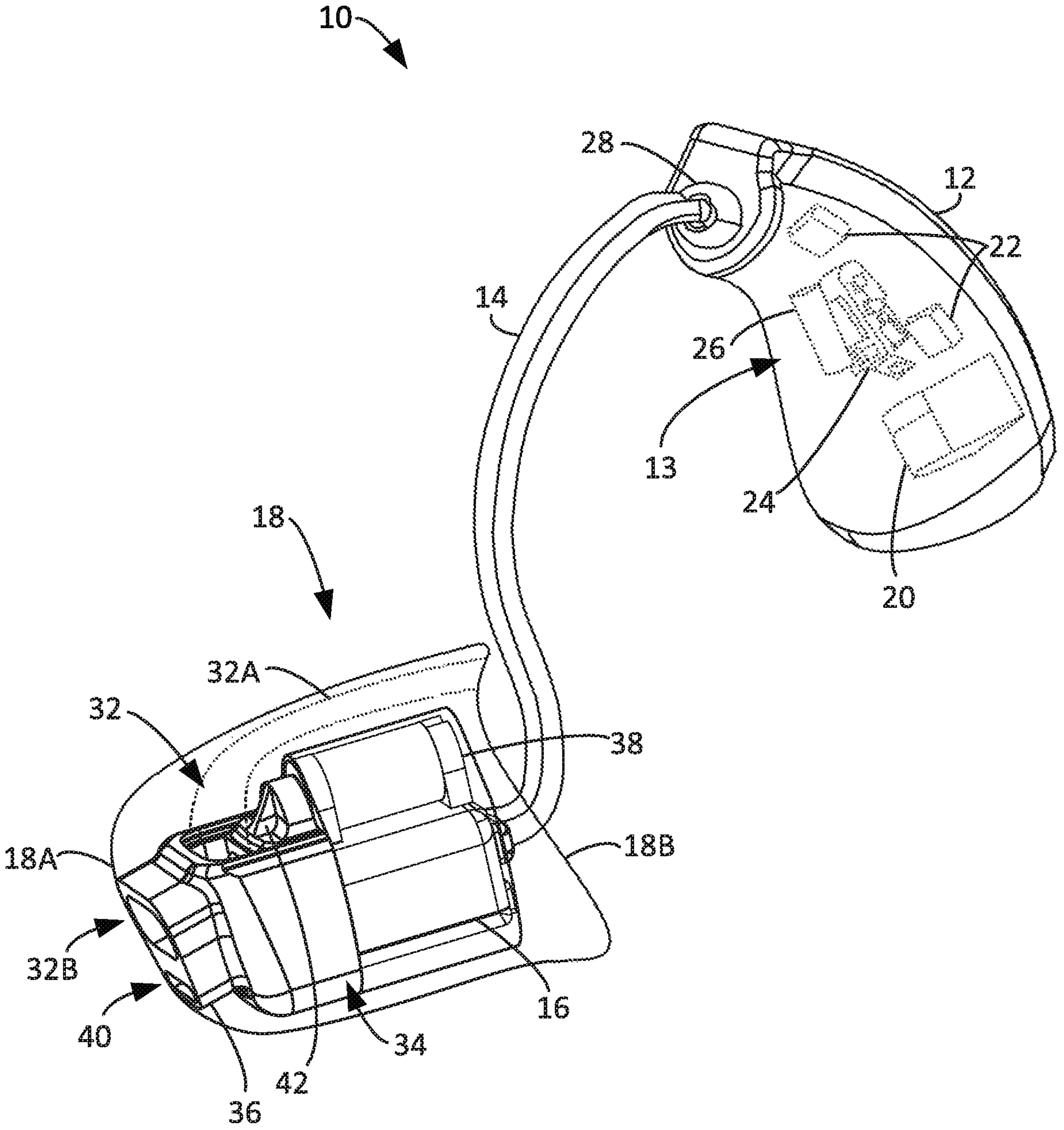
FIG. 1 is a schematic perspective view of a hearing device.

Exemplary techniques, apparatus, and systems shall be described with reference to FIGS. 1-7. It will be apparent to one skilled in the art that elements or processes from one embodiment may be used in combination with elements or processes of the other embodiments, and that the possible embodiments of such techniques, apparatus, and systems using combinations of features set forth herein is not limited to the specific embodiments shown in the Figures and/or described herein. Further, it will be recognized that the embodiments described herein may include many elements that are not necessarily shown to scale. Still further, it will be recognized that timing of the processes and the size and shape of various elements herein may be modified but still fall within the scope of the present disclosure, although certain timings, one or more shapes and/or sizes, or types of elements, may be advantageous over others.

In general, the present disclosure describes various embodiments of solenoid actuators that are adapted to open and close vents in hearing devices. The disclosure herein will use the term “passageway” and “vent.” It is to be understood as used herein that a “passageway” can include any hole, cavity, depression, and/or groove that provides a pathway for sound. It is to be understood as used herein that a “vent” can include one or more passageways that extend through an in-ear hearing device or in-ear portion of a hearing device. For example, a vent may include one or more passageways that together extend from a surface of a custom fit earpiece adjacent to an audio outlet to a surface of the custom fit earpiece that is not intended to reside within the wearer’s ear canal.

Hearing devices with custom fit earpieces may include vents that can allow ambient sound to enter the ear canal and provide localization cues and situational awareness. Vents of custom-fit earmolds may mitigate an undesirable condition known as the occlusion effect, e.g., an unnatural perception of a user’s own voice often described as boomy and/or hollow. However, vents may allow unwanted sounds to reach the wearer’s eardrum. For example, unwanted noise may include ambient sounds in noisy environments such as parties, restaurants, and other social gathering places. Additionally, vents may also contribute to one or more undesirable effects. For example, vents in digital signal processing (DSP) based hearing devices may allow acoustic waves to enter the ear canal earlier than the amplified signal, thereby creating a comb-filtered response that may be undesirable to users. Comb-filtered responses can be particularly undesirable when listening to music. Furthermore, if a hearing device is streaming music, vents may reduce the low-frequency response of the device. There is a desire, therefore, to provide a hearing device that can control the venting of an earpiece of the hearing device based at least in part on a listening environment of the wearer.

A solenoid actuator is a device that may include a coil of wire wrapped around a ferromagnetic core. Electricity applied through the coil produces a magnetic field that may operate on the core. The core may behave as a linear actuator where an electrical current can produce linear translation (often referred to as 'stroke'). If the core (often referred to as a 'shaft') is sufficiently magnetic and the polarity of the electrical current is flipped, the actuator can reverse its stroke and return to its original position. A properly-engineered solenoid can be a compact and efficient way to create actuation (e.g., linear).

Adding an additional component on the end of the solenoid's shaft turns the solenoid into an actuator. This actuator, when mechanically coupled to an acoustical conduit, can open and close the conduit, thereby operating as a valve. The acoustical conduit can be a vent in a hearing device that may include a simple hole in the tip of a custom earmold. The actuation technique can include a barrier, cam, cantilever, or system of gears. For those skilled in the art of kinematics, these techniques and actuators can be developed to open or close a vent of a hearing device using a barrier such as, e.g., a valve, plunger, gate, flap, core, or other structure that may be moved or manipulated to block the vent.

A solenoid operating in a hearing device to open and close a vent can be used to manage the frequency response of the hearing device for different modes of operation. For example, if the hearing device is streaming music to the wearer, the vent can be closed to provide a flat response in low frequencies. Similarly, in loud ambient noise environments such as a cocktail party, the vent can be closed to attenuate the exterior ambient noise propagating through the vent. If a wearer with moderate hearing loss is in a quiet environment, the vent can be open to allow ambient sounds to propagate to the tympanic membrane more naturally. Further, if a wearer is in a quiet environment listening to music, the vent can be closed to prevent the acoustic signal from interacting with the amplified signal, thereby preventing an undesired comb filtering effect.

An exemplary schematic perspective view of a hearing device 10 is shown in FIG. 1. The hearing device 10 may include a hearing device body 12, a cable 14, a receiver 16, and an earpiece 18.

The cable 14 may be coupled between the hearing device body 12 and the receiver 16. The cable 14 may provide an electrically conductive medium for providing electrical signals from electronic components 13 of the hearing device body 12 to the receiver 16. The cable 14 may also be coupled to electronic components within earpiece 18 and provide electrical signals from electronic components 13 of the hearing device body 12 to electronic components within the earpiece 18. The receiver 16 can generate sound based on the electrical signals provided by the electronic components 13 of the hearing device 10. The earpiece 18 may allow receiver 16 to fit comfortably in a wearer or user ear canal.

The electronic components 13 are shown with dotted lines inside the hearing device body 12. The electronic components 13 inside the hearing device body 12 may include a battery 20, microphones 22, a circuit board 24, and a telecoil 26. The battery 20 may be electrically coupled to the circuit board 24 to provide power to the circuit board 24. Microphones 22 may be electrically coupled to the circuit board 24 to provide electrical signals representative of sound (e.g., audio data, etc.) to the circuit board 24. Telecoil 26 may be electrically coupled to the circuit board 24 to provide electrical signals representative of changing magnetic fields (e.g., audio data, etc.) to the circuit board 24. Circuit board 24 may be electrically coupled to a cable plug 28 to provide electrical signals and currents to the receiver 16 and components of earpiece 18.

Microphones 22 may receive sound (e.g., vibrations, acoustic waves) and generate electrical signals (e.g., audio data, etc.) based on the received sound. Audio data may represent the sound that was received by microphones 22. Microphones 22 can be any type suitable for hearing devices such as electret, MicroElectrical-Mechanical System (MEMS), piezoelectric, or other type of microphone. Audio data produced by microphones 22 can be analog or digital. Microphones 22 may provide the audio data to circuit board 24.

Telecoil 26 may detect changing magnetic fields and generate electrical signals (e.g., audio data) based on the changing magnetic fields. For example, telecoil 26 can detect a changing magnetic field produced by a speaker in a telephone or a loop system and generate audio data based on such magnetic field. Telecoil 26 may provide the electrical signals (e.g., audio data) to the circuit board 24. Using the telecoil 26, the hearing device 10 may filter out background speech and acoustic noise to provide a better and more focused listening experience for the wearer.

The circuit board 24 may include any suitable circuit components for operating hearing device 10. The circuit components of the circuit board 24 may include one or more of controllers, processors (e.g., the processing apparatus 62 of FIG. 6), and memory for executing programs of the hearing device 10. The circuit board 24 may additionally include any of an analog-to-digital converter (ADC), a digital-to-analog converter (DAC), a communication device, passive electronic components, amplifiers, or other components used digital signal processing.

The earpiece 18 may be molded or otherwise shaped to fit at least partially in a wearer's ear canal and/or conform to the shape thereof. In one or more embodiments, earpiece 18 may be a hollow shell. The earpiece 18 can include any suitable material such as, e.g., plastic, elastomeric materials, ceramics, 3D-printed metals, foams, and non-Newtonian materials of various durometers, etc. Earpiece 18 extends from an ear-tip end 18A to an external end 18B. As shown, the earpiece 18 includes earpiece passageway 32A and solenoid boot 34. The solenoid boot 34 may include an ear-tip suspension element 36 and a solenoid actuator 38. The ear-tip suspension element 36 may include an ear-tip passageway 32B, an acoustic outlet 40, and a barrier 42. The passageways 32A and 32B may connect end to end to form a vent 32. In embodiments where earpiece 18 is a hollow shell, passageway 32A may encompass the entire inner volume of earpiece shell 18, in which case passageway 32B is the only acoustical conduit in such an embodiment.

The vent 32 may be open and closed by barrier 42. The barrier 42 may be any suitable structure, e.g., a plunger, flap, valve, gate, needle, etc. In one or more embodiments, the barrier 42 is a plunger. The plunger may be any suitable shape such as, e.g., blade shaped, frustroconically shaped, bar shaped, needle shaped, etc. The barrier 42 may include any suitable materials such as, e.g., plastic, metal, elastomer, etc. The barrier 42 may move along a path between an open position (e.g., FIG. 2) and a closed position (e.g., FIG. 3) and/or rotate about a hinge. The path between the open position and the closed position may be linear or rotational. The barrier 42 may be mechanically coupled to a core (e.g., the core 46 of FIGS. 3-4) of the solenoid actuator 38 to allow movement of the core of the solenoid actuator to move the barrier. In one or more embodiments, the path between the open position and the closed position may extend along a direction parallel to an axis (e.g., axis 47 of FIGS. 2-3) of the core of the solenoid actuator 38. Thus, the position of the barrier 42 may be controlled by the solenoid actuator 38. In the closed position, the barrier 42 may block or occlude the vent 32. The barrier 42 may block or occlude the vent 32 anywhere along ear-tip passageway 32B when the barrier is in the closed position. In one or more embodiments, the barrier 42 may block or occlude the vent 32 where ear-tip passageway 32B connects to earpiece passageway 32A when the barrier is in the closed position. In the open position, the barrier 42 may allow passageways 32A and 32B to connect, providing an acoustic pathway that is not blocked or occluded and extends from the ear-tip end 18A of earpiece 18 to a portion of the earpiece 18 designed to be outside the ear canal such as, e.g., the external end 18B of the earpiece.

Figure 3:
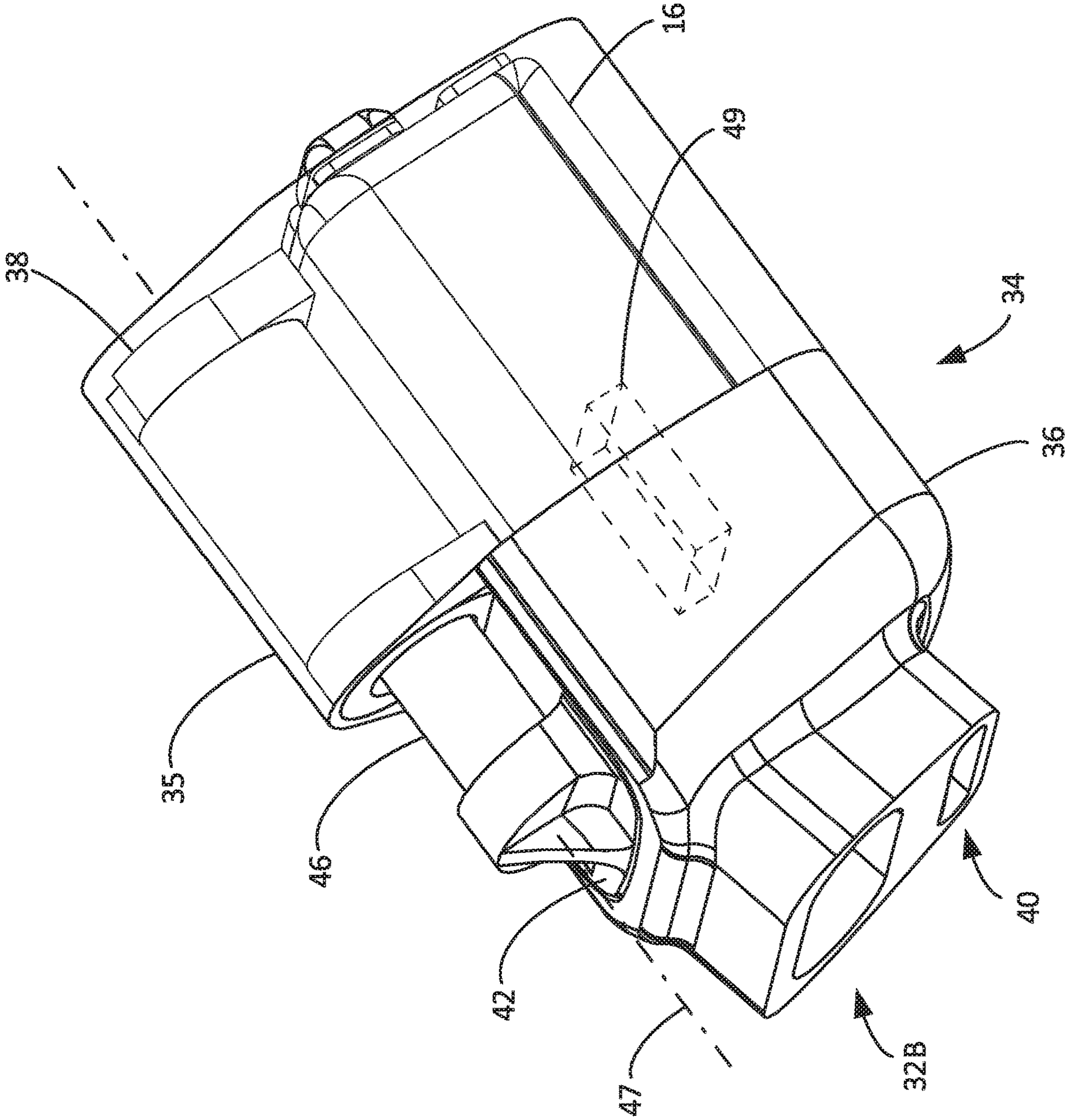
FIG. 3 is a schematic perspective view of the solenoid boot of FIG. 2 with the solenoid actuator of the ear-tip suspension element disposed in a closed position.
Figure 4:
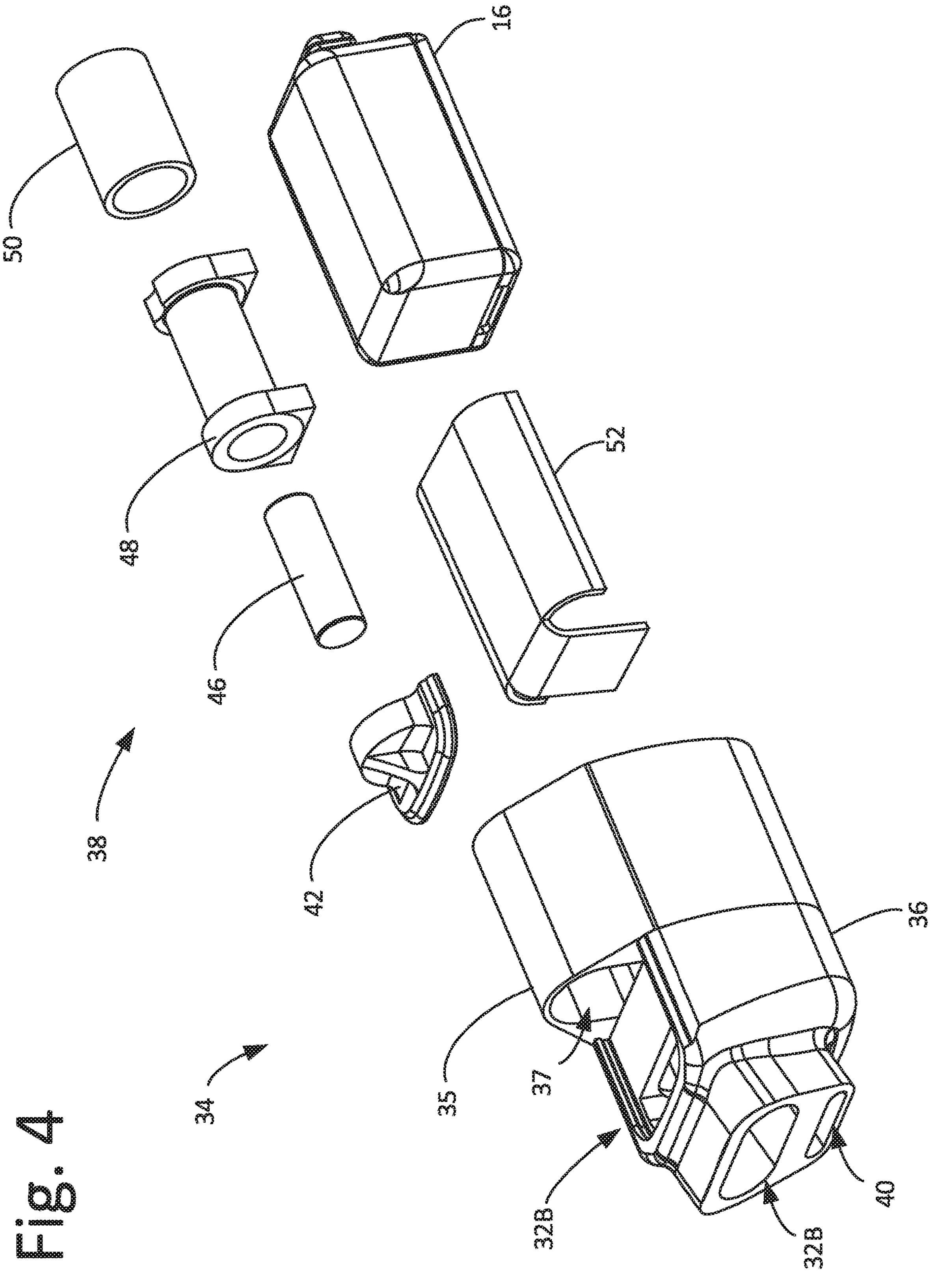
FIG. 4 is a schematic exploded view of the solenoid boot of FIGS. 2-3.

The solenoid actuator 38 may include a core (e.g., the core 46 of FIGS. 3-4) and a solenoid (e.g., the solenoid 50 of FIG. 4). The solenoid actuator 38 may be operatively coupled to the circuit board 24. In one or more embodiments, the solenoid actuator 38 may be operatively coupled to the circuit board 24 via the cable 14. The solenoid actuator 38 may receive an electrical current from the circuit board 24 that causes the solenoid of the solenoid actuator 38 to generate a magnetic field. The generated magnetic field may cause the core of solenoid actuator 38 to move along a linear actuation path. The linear actuation path may extend along an axis (e.g., axis 47 of FIGS. 2-3) of the core. The direction of the magnetic field lines of the magnetic field generated by the solenoid 50 of the solenoid actuator 38 depends on the direction of the provided electrical current. By reversing the direction of the provided current the magnetic field lines will be reversed and the core of the solenoid actuator 38 may be moved in the opposite direction along the linear actuation path. Thereby, hearing device 10 may control movement of the core along the linear actuation path between the open and the closed position.

The circuit board 24 may include a controller (e.g., processing apparatus 62 of FIG. 6) including one or more processors. The controller of circuit board 24 may be operably coupled to a solenoid (e.g., solenoid 50 of FIG. 4) of the solenoid actuator 38 to control movement of the core of the solenoid actuator between the open and closed position. The controller of circuit board 24 may be configured to move the core 46 using the solenoid 50 based on at least a listening environment of the hearing device 10. The controller of circuit board 24 may be configured to provide a current to the solenoid 50 of the solenoid actuator 38 to control the movement of the core of the solenoid actuator.

Figure 2:
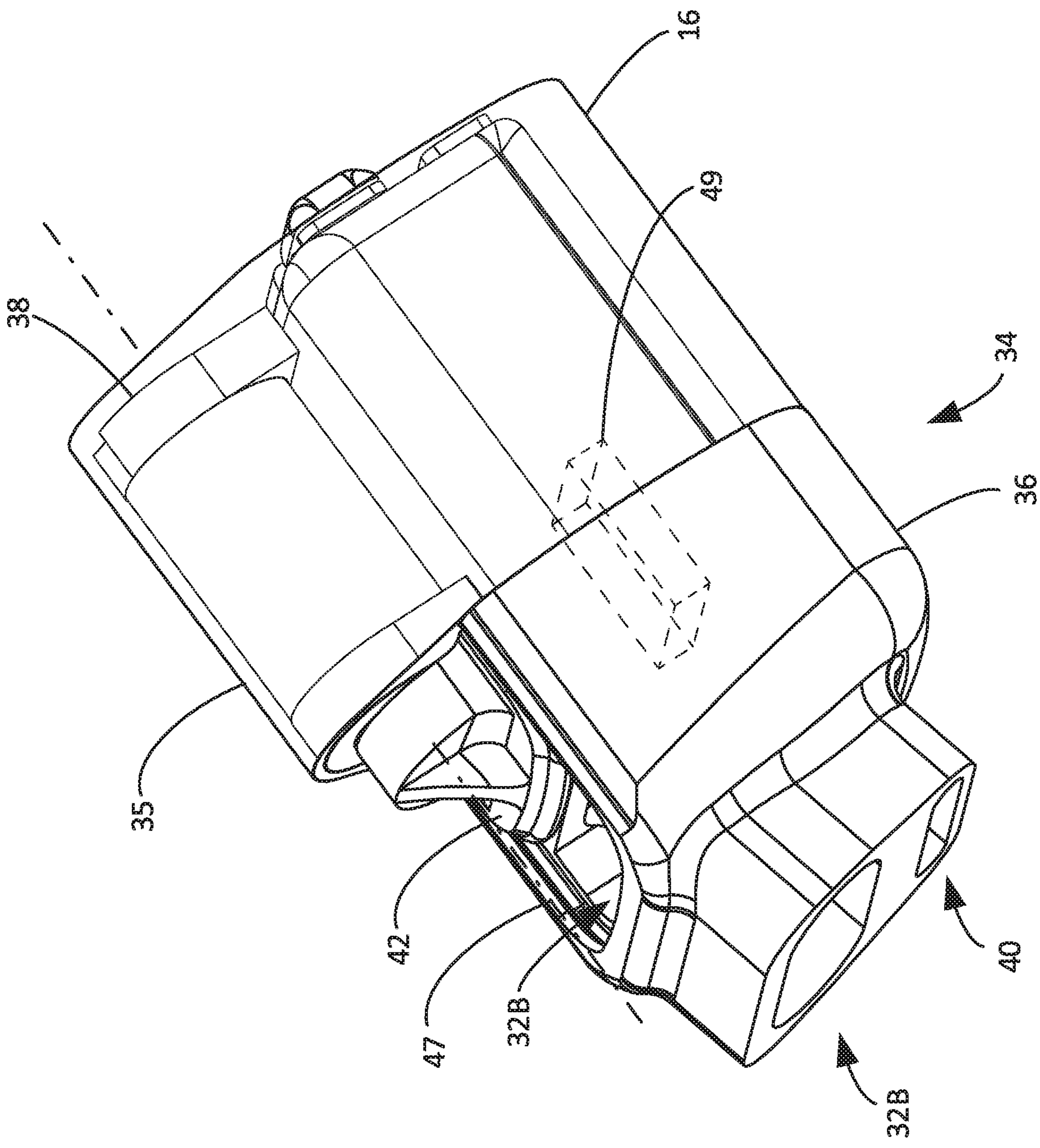
FIG. 2 is a schematic perspective view of a solenoid boot of the hearing device of FIG. 1 with a solenoid actuator of an ear-tip suspension element disposed in an open position.

Exemplary schematic perspective views of the solenoid boot 34 are shown in FIGS. 2-4. As shown in FIG. 2, the barrier 42 and the core (e.g., core 46 of FIGS. 3-4) of solenoid actuator 38 are in the open position. In one or more embodiments, the ear-tip passageway 32B extends through the ear-tip suspension element 36 and is unobstructed, or not occluded by the barrier 42 when the barrier and/or the core 46 are in the open position. As shown in FIG. 3, the barrier 42 and the 46 core of the solenoid actuator 38 are in the closed position. In one or more embodiments, the ear-tip passageway 32B is obstructed or occluded by the barrier 42 when the barrier and/or the core 46 are in the closed position. The position of the core 46 along the linear actuation path between the open and closed position may be maintained by a magnet 49 when the magnetic field of the magnet is stronger than the magnetic field produced by the solenoid 50. In one or more embodiments, the position of core 46 at any open, closed, or intermediate location along the linear actuation path is maintained by the force of attraction between core 46 and magnet 49 located within receiver 16. In embodiments where receiver 16 is a balanced-armature receiver, magnet 49 is a typical component used to balance the internal armature of the receiver. Magnet 49 may create an evanescent magnetic field outside the housing of the receiver 16, thereby interacting with and exerting a force on the solenoid core 46. In other words, to actuate the solenoid core 46, the magnetic field produced by solenoid 50 may overcome the force of attraction between magnet 49 and the solenoid core 46. After the solenoid core 46 is actuated to a new position by providing the solenoid 50 with an electrical pulse, the force of attraction between the solenoid core and the magnet 49 may keep the solenoid core fixed in the new position.

The magnet 49 may be a permanent magnet or an electromagnet. In one or more embodiments, the magnet 49 may include permanent magnetic materials such as, e.g., nickel, neodymium, iron, ceramics, cobalt, etc. In one or more embodiments, the magnet 49 may include conductive materials such as, e.g., copper, gold, silver, aluminum, etc. The magnet 49 may be disposed at least partially in ear-tip suspension element 36. The magnet 49 may be positioned such that at least a portion of a magnetic field of the magnet runs parallel to the axis 47. In one or more embodiments, the magnet 49 may be a magnet of the receiver 16. In one or more embodiments, the magnet 49 may include more the one magnet, e.g., a magnet stack.

The ear-tip suspension element 36 may maintain a position of the receiver 16 and/or the magnet 49 adjacent to the solenoid actuator 38 such that the magnet can hold the core 46 in place at any point along the linear actuation path between the open and closed position when the magnetic field of the magnet is stronger than the magnetic field produced by the solenoid 50. The ear-tip suspension element 36 may include any suitable structure or shape to maintain the position of the receiver 16 and/or the magnet 49 adjacent to the solenoid actuator 38. For example, the solenoid boot 34 may include one or more of a cavity, recess, adhesive, retention element, etc. that can maintain the position of the receiver 16 and/or the magnet 49.

An exemplary schematic exploded view of the solenoid boot 34 is shown in FIG. 4. The solenoid 50 may include any suitable materials such as, e.g., copper, aluminum, gold, silver, or any other electrically-conductive material. The solenoid 50 may be wrapped any suitable number of times to provide a magnetic field strong enough to move the core 46. Additionally, solenoid 50 may be concealed or protected by a coating. The coating may include any suitable materials such as, e.g., epoxy, plastic, etc. The coating may prevent solenoid 50 from unwinding. As shown, solenoid 50 may be wrapped around a bobbin 48. The bobbin 48 may be hollow to allow the core 46 to move freely along the linear actuation path. The bobbin 48 may include a stopping element, or cover, to prevent the core 46 from falling out of the bobbin and/or the solenoid boot 34. The bobbin 48 may act as a guide to keep the axis 47 of the core 46 and the linear actuation path aligned. The bobbin 48 may include any suitable material such as, e.g., ferromagnetic material, plastic, ceramic, metal, etc. The bobbin 48 may be any suitable shape such as, e.g., cylindrical, polyhedral, cuboid, etc.

The core 46 may be shaped to allow the core to move within the bobbin 48 and/or the solenoid 50. The core 46 may be any suitable shape such as, e.g., cylindrically shaped, bar shaped, polyhedrally shaped, etc. In one or more embodiments, the core 46 is cylindrically shaped. The core 46 may include any suitable magnetic materials such as, e.g., neodymium, ceramic, samarium-cobalt, ferric oxide, etc. The core 46 may include an external coating. The external coating of the core 46 may include any suitable material such as, e.g., nickel, copper, Teflon, etc. In one or more embodiments, the external coating of the core 46 includes a combination of nickel and Teflon.

The solenoid boot 34 may include a magnetic guide 52. The magnetic guide 52 may include any suitable materials such as, e.g., permalloy, mu-metal, ferromagnetic coatings, or other high magnetic permeability metal alloys. The magnetic guide 52 may be any suitable size or shape, e.g., curved, bar, planar sheet, etc. The magnetic guide 52 may be arranged near or adjacent to the receiver 16 and/or magnet 49 to guide the magnetic field of magnet to desired locations (e.g., to the core 46).

Figure 5:
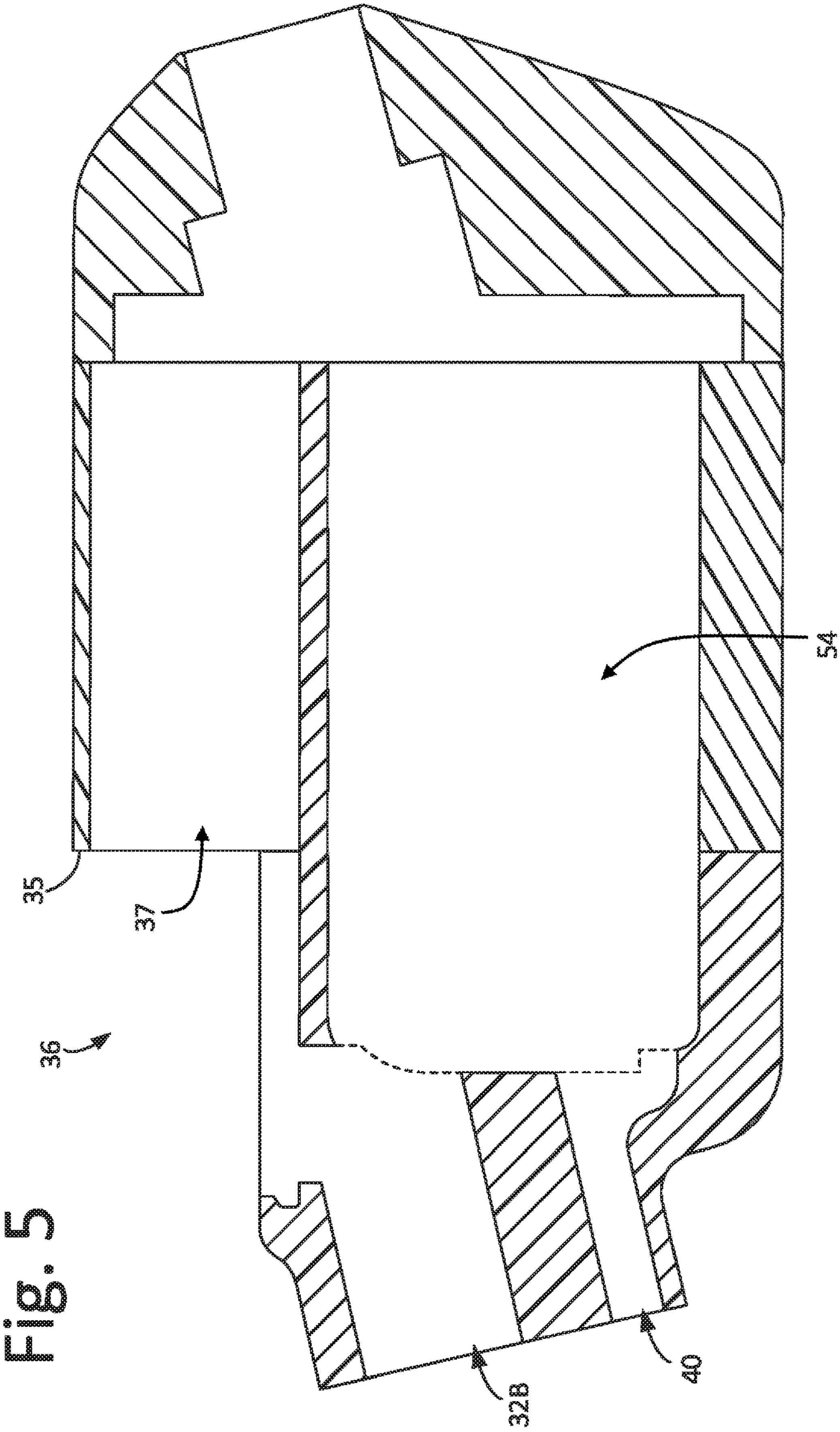
FIG. 5 is a schematic cross-sectional view of an ear-tip suspension element of the solenoid boot of FIGS. 2-4.

An exemplary schematic cross-sectional view of the ear-tip suspension element 36 is shown in FIG. 5. As shown, the ear-tip suspension element 36 includes the ear-tip passageway 32B, the solenoid retention element 35, a solenoid cavity 37, the acoustic port 40, and a cavity 54. As shown, retention element 35 may include the cavity 37 to receive at least a portion of the solenoid actuator 38. The ear-tip passageway 32B extends entirely through ear-tip suspension element 36. Further, the acoustic port 40 extends to the cavity 54. The acoustic port 40 may be positioned to align with an acoustic outlet of the receiver 16. The cavity 54 may be shaped, or otherwise configured, to receive the receiver 16 and/or the magnet 49. Ear-tip suspension element 36 may or may not include an obstruction (e.g., a wall) between the cavity 54 and the ear-tip passageway 32B.

Figure 6:
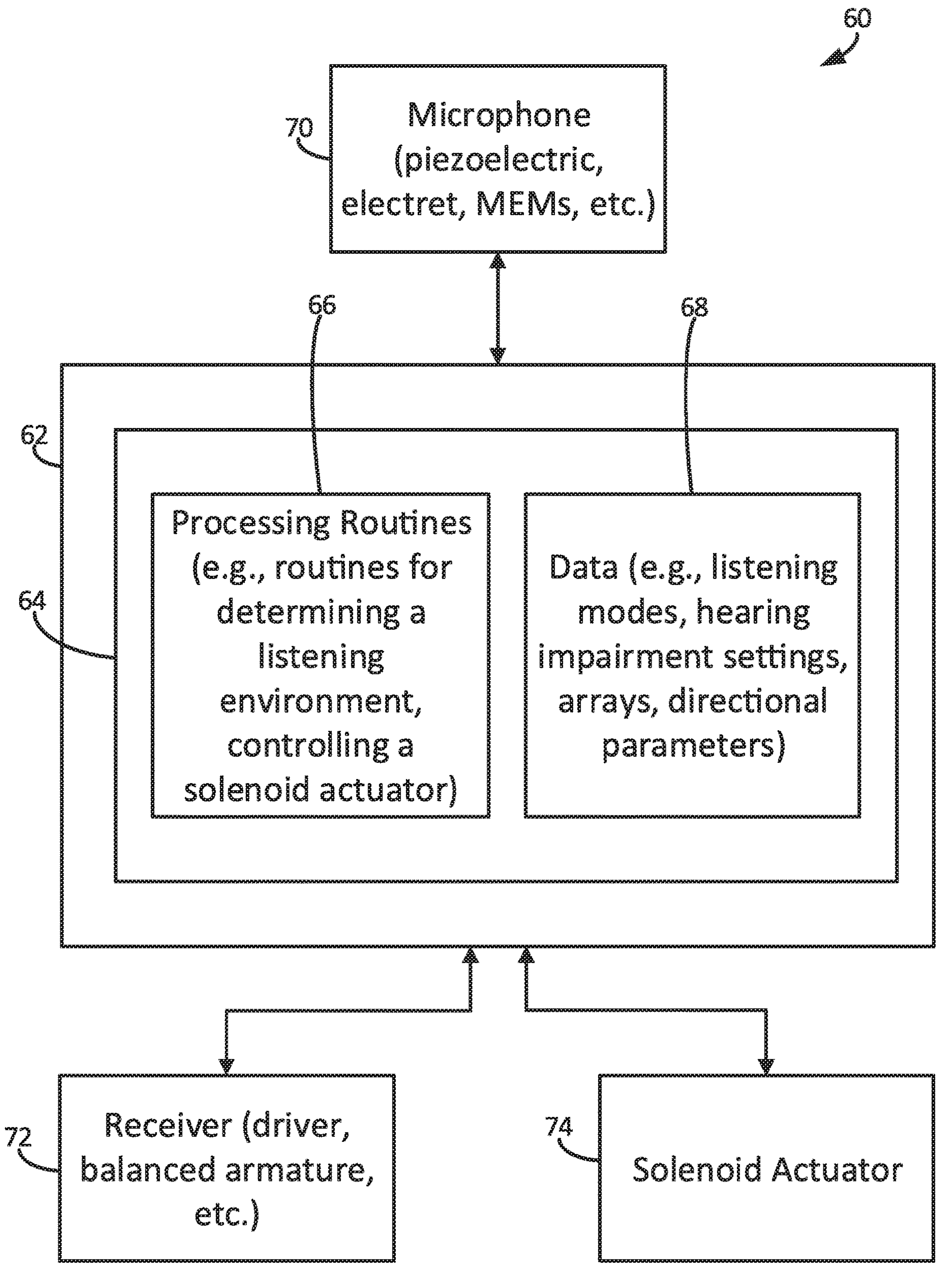
FIG. 6 is a schematic system block diagram of a hearing device.

An exemplary schematic system block diagram of a hearing device 60 including a solenoid actuator (e.g., solenoid actuator 38 of FIGS. 1-5) and for use in determining a listening environment as described herein is depicted in FIG. 6. The hearing device 60 may include a processing apparatus or processor 62 and a microphone 70 (e.g., microphones 22 of FIG. 1). Generally, the microphone 70 may be operably coupled to the processing apparatus 62 and may include any one or more devices configured to generate audio data from sound and provide the audio data to the processing apparatus 62. The microphone 70 may include any apparatus, structure, or device configured to convert sound into sound data. For example, the microphone 70 may include one or more diaphragms, crystals, spouts, application-specific integrated circuits (ASICs), membranes, sensors, charge pumps, etc. Sound data may include voice data when the sound received by the microphone 70 is sound of a voice.

The sound data generated by the microphone 70 may be provided to the processing apparatus 62, e.g., such that the processing apparatus 62 may analyze, modify, store, and/or transmit the sound data. Further, such sound data may be provided to the processing apparatus 62 in a variety of different ways. For example, the sound data may be transferred to the processing apparatus 62 through a wired or wireless data connection between the processing apparatus 62 and the microphone 70.

The hearing device 60 may additionally include a receiver 72 (e.g., receiver 16 of FIG. 1) operably coupled to the processing apparatus 62. Generally, the receiver 72 may include any one or more devices configured to generate sound. For example, the receiver 72 may include one or more drivers, diaphragms, armatures, spouts, housings, etc. The receiver 72 may include any suitable sound producing transducer, e.g., balanced-armature receiver, moving-coil dynamic, electrostatic, piezoelectric, piezoresistive, etc. The sound generated by the receiver 72 may be controlled by the processing apparatus 62, e.g., such that the processing apparatus 62 may cause sound to be generated by the receiver 72 based on sound data. Sound data may include, for example, voice data, hearing impairment settings, noise level, etc.

The hearing device 60 may additionally include a solenoid actuator 74 operably coupled to the processing apparatus 62. Generally, the solenoid actuator 74 may include any one or more devices configured to open and close a vent (e.g., solenoid actuator 38 of FIGS. 1-4). For example, the solenoid actuator 74 may include one or more cores, solenoids, coatings, etc. The solenoid actuator 74 may generate a magnetic field based on an electrical current received from the processing apparatus 62. The generated magnetic field may move a core of the solenoid actuator 74.

Further, the processing apparatus 62 includes data storage 64. Data storage 64 allows for access to processing programs or routines 66 and one or more other types of data 68 that may be employed to carry out the exemplary techniques, processes, and algorithms of determining a listening environment of the hearing device 60 and controlling the solenoid actuator 74 based on the determined listening environment. For example, processing programs or routines 66 may include programs or routines for performing computational mathematics, matrix mathematics, Fourier transforms, compression algorithms, calibration algorithms, image construction algorithms, inversion algorithms, signal processing algorithms, normalizing algorithms, deconvolution algorithms, averaging algorithms, standardization algorithms, comparison algorithms, vector mathematics, analyzing sound data, analyzing hearing device settings, controlling a solenoid actuator, detecting defects, or any other processing required to implement one or more embodiments as described herein.

Data 68 may include, for example, sound data (e.g., noise data, etc.), hearing impairment settings, thresholds, hearing device settings, arrays, meshes, grids, variables, counters, statistical estimations of accuracy of results, results from one or more processing programs or routines employed according to the disclosure herein (e.g., determining a listening environment, controlling a solenoid actuator, etc.), or any other data that may be necessary for carrying out the one or more processes or techniques described herein.

In one or more embodiments, the hearing device 60 may be controlled using one or more computer programs executed on programmable computers, such as computers that include, for example, processing capabilities (e.g., microcontrollers, programmable logic devices, etc.), data storage (e.g., volatile or non-volatile memory and/or storage elements), input devices, and output devices. Program code and/or logic described herein may be applied to input data to perform functionality described herein and generate desired output information. The output information may be applied as input to one or more other devices and/or processes as described herein or as would be applied in a known fashion.

The programs used to implement the processes described herein may be provided using any programmable language, e.g., a high-level procedural and/or object orientated programming language that is suitable for communicating with a computer system. Any such programs may, for example, be stored on any suitable device, e.g., a storage media, readable by a general or special purpose program, computer or a processor apparatus for configuring and operating the computer when the suitable device is read for performing the procedures described herein. In other words, at least in one embodiment, the hearing device 60 may be controlled using a computer readable storage medium, configured with a computer program, where the storage medium so configured causes the computer to operate in a specific and predefined manner to perform functions described herein.

The processing apparatus 62 may be, for example, any fixed or mobile computer system (e.g., a personal computer or minicomputer). The exact configuration of the computing apparatus is not limiting and essentially any device capable of providing suitable computing capabilities and control capabilities (e.g., control the sound output of the hearing device 60, the acquisition of data, such as audio data or sensor data) may be used. Further, various peripheral devices, such as a computer display, mouse, keyboard, memory, printer, scanner, etc. are contemplated to be used in combination with the processing apparatus 62. Further, in one or more embodiments, the data 68 (e.g., sound data, voice data, hearing impairment settings, hearing device settings, an array, a mesh, a digital file, etc.) may be analyzed by a wearer, used by another machine that provides output based thereon, etc. As described herein, a digital file may be any medium (e.g., volatile or non-volatile memory, a CD-ROM, a punch card, magnetic recordable tape, etc.) containing digital bits (e.g., encoded in binary, trinary, etc.) that may be readable and/or writeable by processing apparatus 62 described herein. Also, as described herein, a file in wearer-readable format may be any representation of data (e.g., ASCII text, binary numbers, hexadecimal numbers, decimal numbers, audio, graphical) presentable on any medium (e.g., paper, a display, sound waves, etc.) readable and/or understandable by a wearer.

In view of the above, it will be readily apparent that the functionality as described in one or more embodiments according to the present disclosure may be implemented in any manner as would be known to one skilled in the art. As such, the computer language, the computer system, or any other software/hardware that is to be used to implement the processes described herein shall not be limiting on the scope of the systems, processes or programs (e.g., the functionality provided by such systems, processes or programs) described herein.

The techniques described in this disclosure, including those attributed to the systems, or various constituent components, may be implemented, at least in part, in hardware, software, firmware, or any combination thereof. For example, various aspects of the techniques may be implemented by the processing apparatus 62, which may use one or more processors such as, e.g., one or more microprocessors, DSPs, ASICs, FPGAs, CPLDs, microcontrollers, or any other equivalent integrated or discrete logic circuitry, as well as any combinations of such components, image processing devices, or other devices. The term "processing apparatus," "processor," or "processing circuitry" may generally refer to any of the foregoing logic circuitry, alone or in combination with other logic circuitry, or any other equivalent circuitry. Additionally, the use of the word "processor" may not be limited to the use of a single processor but is intended to connote that at least one processor may be used to perform the exemplary techniques and processes described herein.

Such hardware, software, and/or firmware may be implemented within the same device or within separate devices to support the various operations and functions described in this disclosure. In addition, any of the described components may be implemented together or separately as discrete but interoperable logic devices. Depiction of different features, e.g., using block diagrams, etc., is intended to highlight different functional aspects and does not necessarily imply that such features must be realized by separate hardware or software components. Rather, functionality may be performed by separate hardware or software components, or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, magnetic data storage media, optical data storage media, or the like. The instructions may be executed by the processing apparatus 62 to support one or more aspects of the functionality described in this disclosure.

Figure 7:
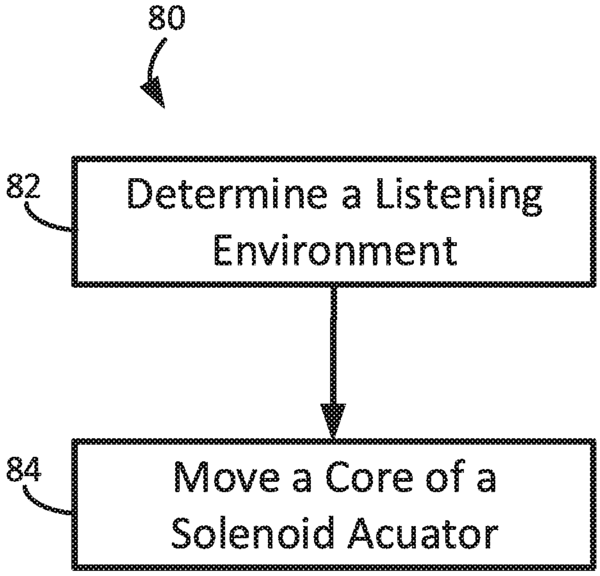
FIG. 7 is a schematic flow diagram of an illustrative technique, or process, for opening and closing a vent in a hearing device.

An exemplary schematic flow diagram of an illustrative technique, or process, 80 for opening and closing a vent (e.g., vent 32 of FIG. 1) in a hearing device (e.g., hearing device 10 of FIGS. 1-5) is shown in FIG. 7. Although described in regard to hearing device 10 of FIGS. 1-5, the technique can be utilized with any suitable hearing device. The technique 80 may include determining a listening environment 82. Determining a listening environment 82 may be based on sound received by the microphones 22, settings of the hearing device 10, a wearer selected listening environment, etc. In one or more embodiments, determining the listening environment may include receiving a listening environment selection. The listening environment selection may be received from a wearer. In another embodiment, the listening environment may be determined based on at least sound received by the hearing device 10.

The technique 80 may include moving the core 46 of the solenoid actuator 38 at 84 between an open position and the closed position to open and close the vent 32 disposed in the earpiece 18 of the hearing device 10 based on at least the determined listening environment of the hearing device. Moving the core 46 may include moving the barrier 42 of the ear-tip suspension element 36 coupled to the core. When moving to the closed position, the barrier 42 may be moved to block at least a portion of the vent 32. In one or more embodiments, the technique 80 may include moving the core 46 to the closed position when the hearing device is streaming music or when noise detected by the hearing device reaches at least a threshold level.

Exemplary techniques, apparatus, and systems herein allow for opening and closing a vent of a hearing device using a solenoid actuator. Opening and closing a vent allows hearing devices to provide an experience customized to the listening environment of the hearing device. For example, the vent can be closed when the hearing device is playing music to provide better low frequency response. Additionally, the vent may be open in quiet environments to allow for situational environments and improve "own voice" sound for the wearer.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

The invention claimed is:

1. A hearing device comprising:

an earpiece comprising an earpiece passageway;

an ear-tip suspension element disposed in the earpiece, the ear-tip suspension element comprising an ear-tip passageway connected to the earpiece passageway to form a vent through the earpiece;

a solenoid actuator comprising a solenoid and a core, the core movable within the solenoid between an open position and a closed position to open and close the vent; and a controller comprising one or more processors and operably coupled to the solenoid actuator to control movement of the core between the open and closed position, the controller configured to move the core using the solenoid based on at least a listening environment of the hearing device.

2. The hearing device of claim 1, further comprising a magnet at least partially disposed in the ear-tip suspension element, wherein the solenoid actuator is configured to move the core along an actuation path arranged alongside the magnet, wherein a magnetic field of the magnet holds the core in place anywhere along the actuation path when a strength of the magnetic field of the magnet at the core is greater than a strength of a magnetic field of the solenoid actuator at the core.

3. The hearing device of claim 2, wherein the magnet is disposed in a receiver at least partially disposed in the ear-tip suspension element.

4. The hearing device of claim 1, wherein the core of the solenoid actuator is a cylindrical magnet.

5. The hearing device of claim 1, wherein the controller is further configured to move the core to the closed position when the hearing device is streaming music or when noise detected by the hearing device reaches at least a threshold level.

6. The hearing device of claim 1, wherein the solenoid actuator further comprises a cylindrical bobbin, wherein the solenoid is wrapped around the outside of the cylindrical bobbin, and further wherein at least a portion of the core is configured to move within the cylindrical bobbin.

7. The hearing device of claim 1, wherein the core comprises an outer coating of Teflon impregnated nickel.

8. The hearing device of claim 1, wherein the core is ferromagnetic.

9. The hearing device of claim 1, wherein the controller is further configured to determine the listening environment based on sound received by the hearing device.

10. The hearing device of claim 1, wherein the ear-tip suspension element further comprises a barrier coupled to the core, wherein the barrier is configured to block at least a portion of the vent when the core is in the closed position.

11. The hearing device of claim 10, wherein the barrier comprises a plunger.

12. The hearing device of claim 1, wherein the ear-tip suspension element further comprises an acoustic outlet.

13. The hearing device of claim 1, wherein the hearing device is configured to be fitted to an ear of a wearer, and wherein the listening environment of the hearing device is selectable by the wearer of the hearing device.

14. A method comprising:

determining a listening environment of a hearing device; and moving a core of a solenoid actuator within a solenoid of the solenoid actuator between an open position and a closed position to open and close a vent disposed in a housing of the hearing device based on at least the determined listening environment of the hearing device.

15. The method of claim 14, further comprising moving the core to the closed position when the hearing device is streaming music or when noise detected by the hearing device reaches at least a threshold level.

16. A solenoid boot comprising:

an ear-tip suspension element comprising:

an ear-tip passageway;

a barrier movable between an open position and a closed position to open and close the ear-tip passageway; and a solenoid actuator comprising a solenoid and a core coupled to the barrier, wherein the core is configured to move within the solenoid and move the barrier between the open position and the closed position based on a current received by the solenoid.

17. The solenoid boot of claim 16, further comprising a magnet at least partially disposed in the ear-tip suspension element.

18. The solenoid boot of claim 17, wherein the magnet is disposed in a receiver at least partially disposed in the solenoid boot; and wherein the core of the solenoid actuator is configured to move along a linear actuation path arranged alongside the receiver such that the magnet of the receiver provides a magnetic field along the linear actuation path that holds the core in place anywhere along the linear actuation path when a force on the core exerted by the magnetic field provided by the receiver exceeds a force exerted by the solenoid actuator on the core.

19. The solenoid boot of claim 16, further comprising an acoustic outlet disposed in the ear-tip suspension element.

20. The solenoid boot of claim 16, wherein the core of the solenoid actuator is a cylindrical magnet.

* * * * *